Figure 1:
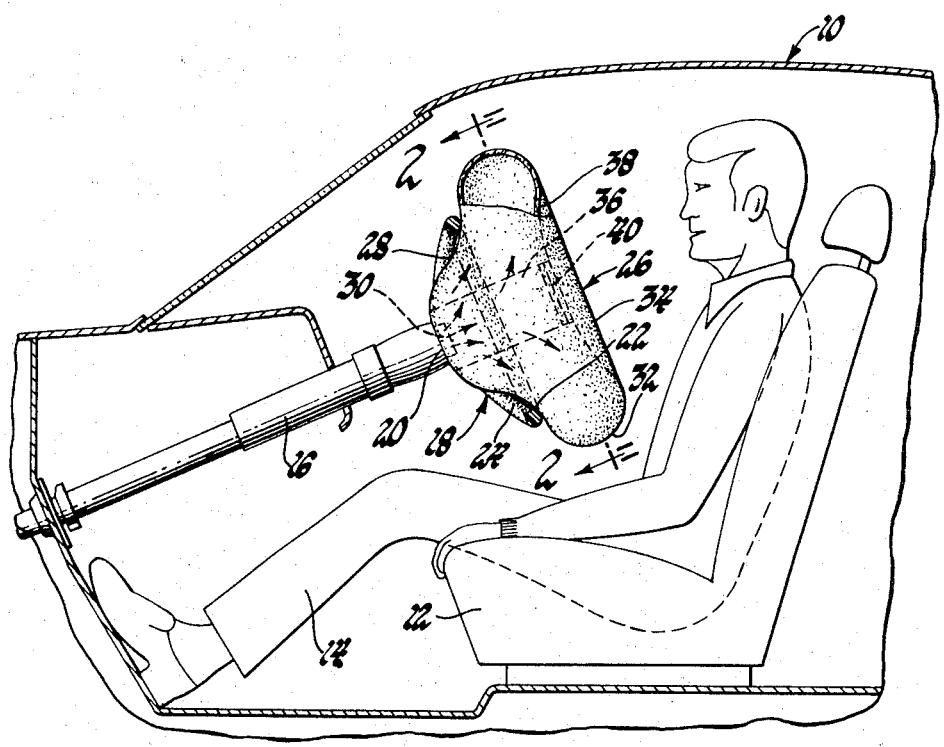

United States Patent [19]
Arntson et al.

[11] 3,727,942
[45] Apr. 17, 1973

[54] INFLATABLE OCCUPANT RESTRAINT CUSHION

[75] Inventors: Gary L. Arntson, Lansing; Rom Rasmussen, Okemos, both of Mich.

[73] Assignee: General Motors Corporation, Detroit, Mich.

[22] Filed: May 3, 1971

[21] Appl. No.: 139,638

[52] U.S. Cl.............280/150 AB, 5/348 R, 267/117, 267/142, 267/118, 280/87 R, 280/150 B
[51] Int. Cl.................................................B06r 21/08
[58] Field of Search....................280/150 AB, 150 B, 280/87 R, 87 A; 5/348, 349; 180/78; 267/117, 118, 142; 74/552

[56] References Cited

UNITED STATES PATENTS

| | | | |
|---|---|---|---|
| 3,618,979 | 11/1971 | Gillette | 280/150 AB |
| 3,580,603 | 5/1971 | Chute | 280/150 AB |
| 2,842,372 | 7/1958 | D'Antini | 280/150 B X |
| 2,833,554 | 5/1958 | Ricordi | 280/150 B |
| 2,919,747 | 1/1960 | Post | 5/349 X |
| 3,614,901 | 10/1971 | Henning | 74/552 |
| 3,016,764 | 1/1962 | Fredericks et al. | 74/552 |
| 3,172,683 | 3/1965 | D'Antini | 74/552 X |

*Primary Examiner*—Kenneth H. Betts
*Assistant Examiner*—John P. Silverstrim
*Attorney*—W. E. Finken and Herbert Furman

[57] ABSTRACT

A vehicle body includes a steering column mounting a conventional steering wheel having a hub portion and a rim portion joined to the hub portion by spokes. A conventional gas generating device is mounted on the hub portion. An inflatable cushion includes a generally frusto-conically shaped inner wall mounted on the hub around the gas generator and merging into a generally arcuate cross section side wall which merges into the outer wall of the cushion. The outer wall is intended to be engaged by the driver. A tubular porous member extends from the inner wall around the gas generator to the outer wall to provide for diffusion of the generated gas and to also limit the movement of the outer wall with respect to the inner wall to provide in the former a depression of generally shallow concave cross section.

4 Claims, 2 Drawing Figures

PATENTED APR 17 1973

3,727,942

INVENTORS.
Gary L. Arntson &
BY  Tom Rasmussen

Herbert Furman
ATTORNEY

INFLATABLE OCCUPANT RESTRAINT CUSHION

This invention relates generally to inflatable occupant restraint cushions and more particularly to such cushions for the driver of the vehicle.

Inflatable occupant restraint cushions for vehicle drivers are known. Generally such cushions are mounted within the steering wheel of the vehicle and project outwardly of the rim of the wheel when inflated for engagement by the driver.

The cushion of this invention is of this general type but differs in that the outer wall which is presentable to the driver includes a generally toroidal outer edge portion bounding a generally centrally located depressed portion of generally outwardly opening concave cross section. This cross section results in improved directional control of the driver and is provided by limiting movement of the outer wall with respect to the inner wall upon inflation.

In the preferred embodiment of the invention, the depression results from a generally porous tubular member joined to the inner wall around the gas generator and joined to the central portion of the outer wall. The tubular member diffuses the products of combustion in addition to limiting the movement of the outer wall with respect to the inner wall. The portion of the outer wall bounded by the tubular member may be provided with a deflector member which is also heat resistant.

It is therefore the primary object of this invention to provide an improved inflatable occupant restraint cushion particularly intended for vehicle drivers and which includes an outer wall presentable to such driver and having a depression of generally outwardly opening concave cross section therein bounded by an outer generally annular portion.

Figure 2:
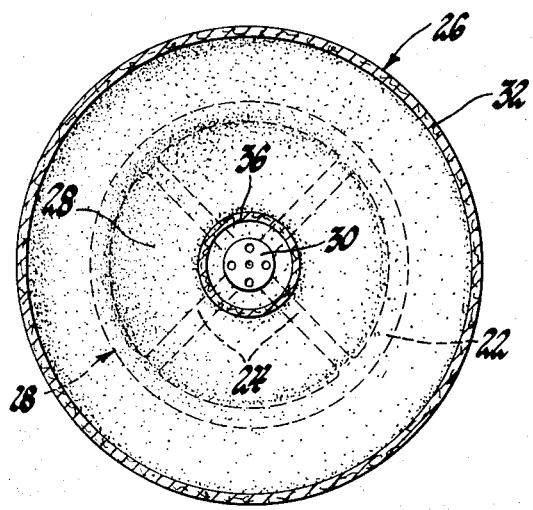

This and other objects of the invention will be readily apparent from the following specification and drawing wherein:

FIG. 1 is a view of a vehicle body embodying an inflatable occupant restraint cushion according to this invention; and FIG. 2 is an enlarged sectional view taken generally along the plane indicated by line 2—2 of FIG. 1.

Referring now to FIG. 1, a vehicle body designated generally 10 includes a front seat 12 which supports a driver 14 in seated position. A conventional steering column 16 mounts a conventional steering wheel 18 which includes a hub portion 20 and a rim 22 interconnected by spokes 24.

A cushion 26 according to this invention, FIGS. 1 and 2, includes an inner wall 28 which is generally of frusto-conical cross section when the cushion is inflated. Wall 28 is secured to the hub portion 20 around a conventional gas generator 30 mounted on the hub portion. The inner wall 28 is of generally annular shape viewed in plan and merges into an annular side wall portion 32 of generally arcuate cross section which in turn merges into an outer wall 34 presentable to the driver upon inflation of the cushion.

A tubular member 36 of porous or semi-porous material provided with a plurality of apertures extends between the inner wall 28 around the gas generator 30 and the outer wall 34, being conventionally secured to each. It will be noted that the gas generator 30 opens to the member 36 and that the member 36 in turn inflates the cushion 26.

The member 36 provides a limit on the movement of the wall 34 relative to the wall 28 whereby upon inflation, the wall 34 is provided with a depression 38 of generally outwardly opening concave cross section. This is bounded, of course, by a generally toroidal shaped portion of the outer wall and of the cushion.

The central depression 38 aids in directional control of the driver 14 should the cushion be inflated and the driver engage the cushion.

A metal or heavy fabric plate 40 may be provided at the outer end of the member 36 to receive the initial pressure of the resultant fluid generated by the gas generator 30 and to also act as a heat-resistant shield between such resultant fluid and the driver 14. Also, this wall may have a foam or similar type covering to trap any particles resulting from the gas generator.

Thus, this invention provides an improved vehicle body occupant restraint cushion.

We claim:

1. An inflatable occupant restraint cushion comprising in combination, an inner wall, an outer annular wall joined to the inner wall to define a pressure fluid receiving cavity therewith and being movable relative to the inner wall upon receipt of pressure fluid within the cavity, inflatable means within the cavity inter-connecting the inner wall and the central portion of the outer wall to limit the movement of the central portion of the outer wall relative to the peripheral portion bounding the central portion and provide the outer wall with a central depression of generally outwardly opening concave cross section, and means communicating the cavity and the inflatable means to each other for inflation of both from a common source of pressure fluid.

2. An inflatable occupant restraint cushion comprises in combination, an inner wall, an outer annular wall joined to the inner wall to define a pressure fluid receiving cavity therewith and being movable relative to the inner wall upon receipt of pressure fluid within the cavity, an inner inflatable member coaxially related to the inner wall and inter-connecting the inner wall and the central portion of the outer wall to limit the movement of the central portion of the outer wall relative to the peripheral portion thereof and provide the outer wall with a central depression of generally outwardly opening concave cross section, means communicating the inner inflatable member with a source of pressure fluid, and means communicating the inner member with the cavity for inflation of the cushion from the inner member.

3. In combination with the vehicle body including a source of pressure fluid, a steering column mounting a steering wheel having a hub and a rim located in spaced relationship thereto, an inflatable occupant restraint cushion including an inner wall of generally frusto-conical shape projecting from the hub outwardly of the rim, means mounting the inner wall adjacent the inner end thereof to the hub of the steering wheel, an outer wall closing the outer end of the inner wall and cooperating therewith to define a pressure fluid receiving cavity, an inner inflatable member enclosed within the inner and outer walls and inter-connecting the inner end of the inner wall and the central portion of the outer wall to limit movement of the central portion of the outer wall relative to the peripheral portion thereof and provide the outer wall with a central depression of generally outwardly opening concave cross section, means communicating the source of pressure fluid with the inner inflatable member adjacent the inner end of the inner wall, and means communicating the inner inflatable member with the cavity to inflate the cushion and the inner member from a common source.

4. The combination recited in claim 3 wherein the inner inflatable member is of generally tubular shape.

* * * * *

UNITED STATES PATENT OFFICE
CERTIFICATE OF CORRECTION

Patent No. 3,727,942    Dated April 17, 1973

Inventor(s) Gary L. Arntson et al.

It is certified that error appears in the above-identified patent and that said Letters Patent are hereby corrected as shown below:

Under "References Cited" the reference "2,919,747  1/1960  Post  5/349X" should be deleted and the following reference substituted:

-- 1,673,636   6/1928  Perry   267/117 --.

Signed and sealed this 13th day of May 1975.

(SEAL)
Attest:

RUTH C. MASON
Attesting Officer

C. MARSHALL DANN
Commissioner of Patents
and Trademarks